Nov. 29, 1960   W. A. BOS   2,961,782
SUCTION DREDGER
Filed Dec. 8, 1958
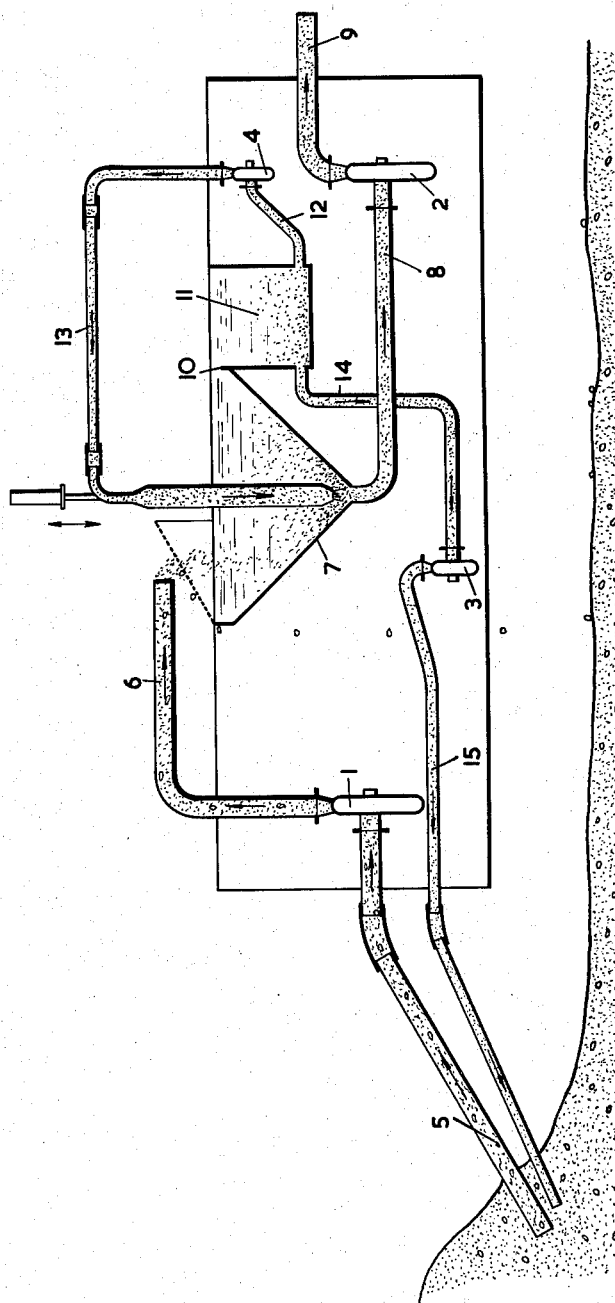
INVENTOR:
Wouter A. BOS
BY:
Wenderoth, Lind & Ponack
Attys

United States Patent Office 2,961,782
Patented Nov. 29, 1960

2,961,782

SUCTION DREDGER

Wouter Arie Bos, Achterweg 22, Dordrecht, Netherlands

Filed Dec. 8, 1958, Ser. No. 778,979

Claims priority, application Netherlands Dec. 7, 1957

1 Claim. (Cl. 37—61)

The optimum efficiency of a suction dredger can only be achieved if the mixing ratio of the water and solids mixture to be displaced is kept accurately adapted to the power which the suction dredger has available for the displacement of said mixture. The optimum mixture ratio of the mixture to be displaced, however, is greatly dependent on the nature of the material to be lifted. However, in conventional suction dredgers it is not feasible to adopt the mixing ratio of the water and solids mixture in dependence on the nature of the material to be lifted to the power available in such a manner that the dredger will always operate with an optimum efficiency.

The object of the invention is to overcome this drawback by providing an improved construction of a suction dredger.

To achieve this end according to the invention the suction dredger is equipped with a suction pump and a pressure pump that are separated from each other, a reservoir being provided between said pumps, which reservoir is provided with an overflow for discharging part of the output of the suction pump into an overflow tank which has connected thereto a conduit including a mixing pump for adjusting the concentration of the mixture withdrawn from the reservoir by the pressure pump as well as a conduit including a flushing pump for recycling part of the output of the suction pump to the suction tube of said pump.

By applying this invention it is possible by regulating the mixing pump and the flushing pump to adjust the optimum operating conditions for the suction pump and the pressure pump independently of each other and thus the maximum benefit can be derived from the power that is available for dredging operations.

The invention will be illustrated by a description of an embodiment of the suction dredger and the operation thereof with reference to the accompanying schematic drawing..

According to said drawing the suction dredger comprises a suction pump 1, a pressure pump 2, a flushing pump 3 and a mixing pump 4.

The suction pump 1 is connected to the suction tube 5 and the water-solids mixture lifted by the suction pump is discharged into a hopper 7 through a conduit 6. A conduit 8 is connected to the bottom of the hopper 7 and leads to a pressure pump 2 which has a pressure pipe 9 connected to its delivery side. Furthermore the hopper 7 communicates with an overflow tank 11 through an overflow 10.

To the bottom of the overflow tank 11 two conduits are connected, the conduit 12, which recycles part of the overflow to the hopper 7 being connected to the mixing pump 4 and the delivery conduit 13 of said pump, while the conduit 14 is connected to the flushing pump 3 and through it to the flushing conduit 15, the outlet opening of which can be moved into the immediate vicinity of the suction mouth of the suction tube 5.

During the operation of the suction dredger the water and solids mixture lifted by the suction pump 1 is discharged into the hopper 7. Through the overflow 10 part of the mixture supplied will flow to the tank 11, which part may have an increased water content due to the fact that the solids contained in the mixture will settle in the hopper 7.

Both when displacing sand and silt the mixture that has flowed into the overflow tank 11 is used partly for giving the mixture that has settled in the lower portion of the hopper 7 the correct composition required for the pressure pump, for which purpose the mixture is recycled to said hopper by the mixing pump 4, and the rest is led by the flushing pump 3 to the suction mouth of the suction tube 5 to assist as a flushing agent in forming a mixture there that is suitable to be lifted by the suction pump, without any solids which have been sucked up earlier being lost. In case silt is being displaced this recycling of part of the mixture lifted is of great importance because this renders it possible to form a mixture adjacent the suction mouth of the suction tube 5 which can be lifted by the pump and which does not contain an undesirable proportion of water, which afterwards cannot be withdrawn from the silt.

Under appropriate circumstances the discharge conduit 6 may be provided with a branch adapted to be connected to the mixing pump 4 or to discharge in the overflow tank 11.

For illustrating the great advantages that can be achieved by operating a suction dredger according to the invention the following examples are subjoined.

1. *Displacement of sand*

It is assumed that a mixture containing the usual content of 10% of solids is sucked up. However, a mixture containing 40% of solids is still excellently suited to be discharged through the delivery pipe of the pressure pump.

For the discharge of 0.4 cubic meter/sec. of solids through the delivery line 1 cubic meter/sec. of the mixture containing 40% of solids is to be delivered by the press pump and 4 cubic meters/sec. of the mixture containing 10% of solids is to be lifted by the suction pump.

For moving the mixture containing 40% of solids over a distance of 2000 meters a delivery conduit having a diameter of 55 centimeters and a rate of flow of 4.1 meters/sec. may be used. A pressure drop of 2.7 meters of water per 100 meters will take place in the delivery conduit, so that for pressing the mixture over a distance of 2000 meters an operating pressure of 5.4 atmos. is required.

Assuming that the suction pump has a working pressure of 1 atmos. that the mixing pump and the flushing pump both have a working pressure of 0.5 atmos. at and that the mixing pump has an output of 600 litres/sec., the four pumps will require:

|  | Kgm./sec. |
|---|---|
| Suction pump | 4000×10=40,000 |
| Press pump | 1000×54=54,000 |
| Flushing pump | 3000× 5=15,000 |
| Mixing pump | 600× 5= 3,000 |
| Total | 112,000 |

For displacing a suction mixture of 4 cubic meters/sec. by means of a conventional dredger having a single combined suction-press pump it would be necessary in the first place to use a delivery conduit having a diameter of 95 centimeters which is practically unfeasible. The rate of flow in said delivery conduit would amount to 5.5 meters/sec. and if the mixture contains 10% of sand the pressure drop would be 1.6 meters of water per 100 meters, so that a pressure of 3.2 atmos. would be required for a delivery conduit measuring 2000 meters to which should be added 1 atmos. for losses in the suction pump and the conduits on board the dredger so that in total 4.2 atmos. of working pressure would be required and consequently the power requirements would be $$4,000 \times 42 = 168,000 \text{ kgm./sec.}$$

or about 50% more than the power requirements of the suction dredger according to the invention.

2. *Displacement of silt*

Let it be assumed that a power of 112,000 kgm./sec. is available. By means of this power a dredger according to the invention has an output of 0.4 cubic meter of solids per second according to Example 1 and under the conditions mentioned therein. A conventional dredger having a single combined suction press pump lifting a mixture containing 10% of solids will then have an output of 10% of $$\frac{112,000}{168,000} \times 4 = 0.27$$

cubic meter of solids per second.

I claim:

A suction dredge comprising a suction pump having a suction tube and a pressure pump, for the supply and discharge respectively of a mixture of water and solids, a reservoir between said pumps into which the discharge side of said suction pump discharges and to which the inlet side of said pressure pump is connected, said reservoir having an overflow, and overflow tank into which said overflow discharges, a mixing pump having the inlet thereto connected to said overflow tank and discharging into said reservoir adjacent the inlet side of said pressure pump, and a flushing pump having the inlet thereto connected to said overflow tank and discharging adjacent the inlet to said suction tube of said suction pump.

References Cited in the file of this patent

UNITED STATES PATENTS

| | | |
|---|---|---|
| 80,225 | Robertson | July 21, 1868 |
| 494,728 | Bailey | Apr. 4, 1893 |
| 1,632,946 | Brunig | June 21, 1927 |